Jan. 15, 1963     L. D. MITCHELL     3,072,955
HAND GRIPS
Filed May 18, 1959
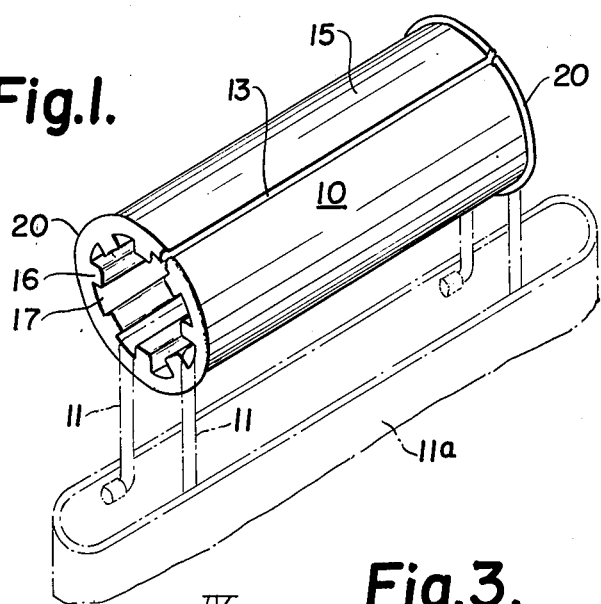
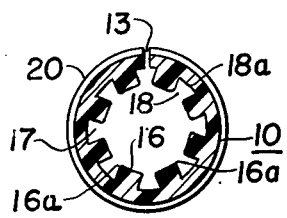
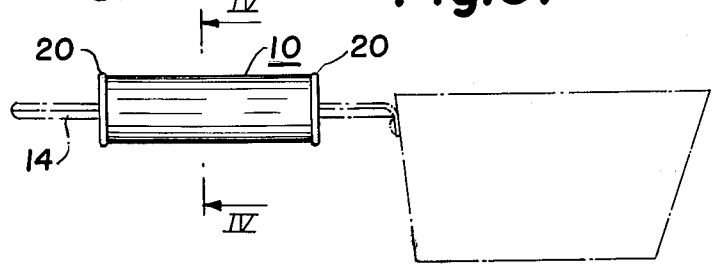
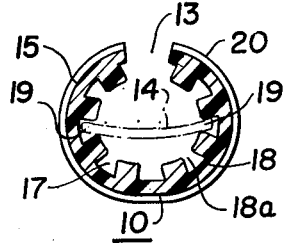
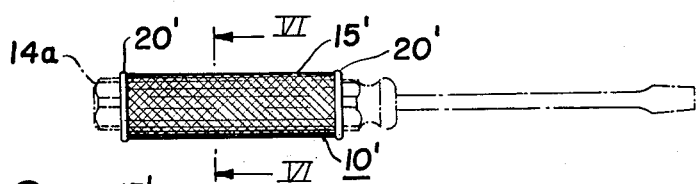
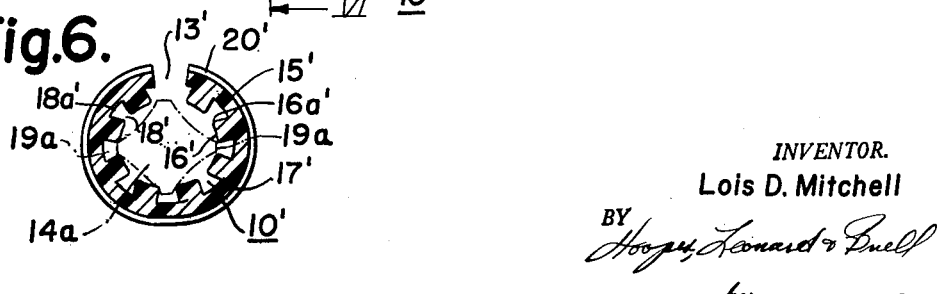
INVENTOR.
Lois D. Mitchell
BY
her ATTORNEYS

United States Patent Office 3,072,955
Patented Jan. 15, 1963

---

3,072,955
HAND GRIPS
Lois D. Mitchell, 2601 Stayton St., Pittsburgh 12, Pa.
Filed May 18, 1959, Ser. No. 813,915
2 Claims. (Cl. 16—114)

This invention relates to hand grips and particularly to hand grips for use with shopping bags, parcels tied with strings or wire and the like, the bails of buckets, baskets and other containers, handles on cooking implements such as pots and pans, and numerous hand tools such as screwdrivers and the like.

Anyone who has ever carried a heavily laden shopping bag or heavy parcel tied with cord will appreciate how the carrying cord will chafe and cut into the flesh of the hand. Likewise anyone who has ever picked up the hot handle of a cooking utensil or has employed the ordinary kitchen potholder in so doing will appreciate that such handles can get very hot and in addition can readily twist or slip in the ordinary potholder. In addition, anyone who has ever used a hand tool such as an ordinary household screwdriver on a particularly tight screw will also readily acknowledge that the grooves in the handle of an ordinary screwdriver can cut sharply into the flesh of the hand.

My invention may be utilized to alleviate any and all of these problems. My hand grip is so constructed that it not only protects the hand from the above mentioned painful cutting sensation or from the aforementioned hot handles but also provides a universal positive gripping action that prevents any slippage of the article grasped thereby whether it be a cord as in a shopping bag, a handle on a cooking pot, or the grooved handle of a household screwdriver. In addition to this, the structure of my hand grip is such that it may be easily carried in one's pocket or purse and may be manufactured at a very low cost.

I provide a tubular body portion of a length approximately equal to the width of the palm of an average adult hand, said body portion being parted on one side along the full length thereof, said body portion having a regular exterior surface, the interior surface of said body portion having a plurality of spaced parallel ribs extending the length of the body portion and parallel to the central axis thereof whereby spaced longitudinal grooves are formed therein, the width of said grooves being narrower along their open side or outer length than along their base length.

Other details, objects and advantages of my invention will become apparent as the following description of a present preferred embodiment thereof proceeds.

In the accompanying drawing I have shown certain present preferred embodiments of the invention in which:

FIGURE 1 is an isometric view of the preferred embodiment of my hand grip applied to a shopping bag handle;

FIGURE 2 is a transverse cross-sectional view of the hand grip shown in FIGURE 1;

FIGURE 3 is an elevational view of the hand grip as applied to a pot handle;

FIGURE 4 is a cross-sectional view taken along line IV—IV of FIGURE 3;

FIGURE 5 is an elevational view of a modified form of the hand grip shown applied to a screwdriver handle; and FIGURE 6 is a cross-sectional view taken along line VI—VI of FIGURE 5.

Referring now to the drawing and initially to FIGURES 1 and 2, I have illustrated a hand grip 10 with the cords 11 of a shopping bag 11a in place therein. Hand grip 10 is comprised of an elongated tubular body portion 12 which is parted along its length at 13. Hand grip 10 is made of a resilient flexible material such as polyethylene and thus can be opened out from parting line 13 to accommodate the placing of cords 11 therewithin, or even opened out sufficiently flat to accommodate the entry of pot handle 14 as shown in FIGURES 3 and 4 or screwdriver handle 14a as shown in FIGURES 5 and 6. The exterior surface 15 of body portion 12 is generally regular and smooth; however, in another embodiment of my invention said surface may be roughened such as by knurling as illustrated by exterior surface 15' in FIGURE 5 to provide a non-slip surface against the palm of the user. The interior surface of body portion 12 has a plurality of parallel ribs 16 which protrude toward the central axis of body portion 12 and extend parallel to said axis over the length of said body portion. Ribs 16 are spaced and thereby form longitudinal grooves 17 therebetween. Ribs 16 are so constructed that when hand grip 10 is opened out flat ribs 16 and grooves 17 have substantially rectangular cross sections. Thus, when hand grip 10 is closed, the cross sections of said grooves are transformed to a truncated triangular configuration, narrower along their open side or outer length 18 than along their base length 18a. The corners 16a of ribs 16 may be slightly rounded off as a relief for the extruding dies in the manufacture of my hand grip. However, this does not form any part of my invention since my hand grip will work equally as well or better if corners 16a are not so relieved. When hand grip 10 is opened to receive the cords, wires, bails of whatever handle is to be held therein, grooves 17 are thereby spread open to receive said handles which may then be placed therein. Hand grip 10 is then released and then gripped to close thereon. When hand grip 10 is closed it is apparent that grooves 17 become narrowed along their outer length portions 18. In closing, groove 17 changes from a substantially rectangular configuration to a truncated triangular configuration and the cord or wire in groove 17 is gripped by the sides of the groove 17 as they narrow and is trapped in the groove due to the narrowing of groove 17 along its open side. It is obvious, of course, that the greater the diameter of the cord or wire, the greater the sides of groove 17 will grip it to prevent the cord from slipping in the groove or from slipping out of the groove altogether. Bails, wires and other like handles are similarly trapped or gripped in grooves 17 by the ribs 16 of my hand grip structure. Likewise on pot handle 14 in FIGURE 4 the edges 19 of handle 14 become engaged in grooves 17 and are securely gripped by this action. So too in the case of screwdriver handle 14a, FIGURE 6, wherein a plurality of edges 19a of handle 14a become securely gripped in grooves 17'. In addition to the above described trapping and gripping advantages provided by ribs 16', said ribs give support and strength to the body 12' of the grip itself.

I also provide in my preferred embodiment a rounded welt 20 at each end of body portion 12 and about the circumference thereof. Welt 20 provides additional strength at the ends of hand grip 10 where the weight of the parcel or bag is most heavily borne and additionally opposes any tendency of the hand grip to crack at the ends thereof as a result of the flexing involved in opening and closing the hand grip. In the embodiment shown in FIGURES 5 and 6, welts 20' provide a similar function as just described with regard to welts 20.

While I have shown and described certain present preferred embodiments of the invention, it is to be distinctly understood that this invention is not limited thereto, but may be otherwise variously embodied within the scope of the following claims.

I claim:
1. A hand grip comprising an elongated tubular body portion of resilient flexible material, said body portion being slit through one side along the full length thereof, the interior surface of said tubular body portion having a plurality of spaced rib members integral therewith and protruding therefrom, said rib members extending substantially the full length of said body portion and being disposed in substantially parallel relation to the central axis of said body portion whereby longitudinal grooves are formed between said rib members, said grooves being substantially narrower along their open portions than along their base portions when said hand grip is in closed position, whereby a cord having a diameter larger than said open portion of the grooves is trapped when disposed in a groove.

2. A hand grip comprising an elongated tubular body portion of resilient flexible material such as polyethylene and the like, said body portion being parted along one side the full length thereof, said parting being substantially parallel to the central axis of said body portion, said body portion having a roughened exterior surface, welt reinforcing means disposed about the circumference of said body portion at the ends thereof and integral therewith, the interior surface of said tubular body portion having a plurality of spaced rib elements integral therewith and protruding therefrom, said rib elements extending substantially the full length of said body portion and being disposed in substantially parallel relation to the central axis of said body portion whereby longitudinal grooves are formed between said rib elements, said grooves being substantially narrower along the open portion thereof than along the base portion when said hand grip is in closed position, whereby a cord having a diameter larger than said open portion of the grooves is trapped when disposed in a groove.

References Cited in the file of this patent
UNITED STATES PATENTS

| | | |
|---|---|---|
| 614,173 | Kelly | Nov. 15, 1898 |
| 2,140,157 | Huffman | Dec. 13, 1938 |
| 2,173,451 | Lorber | Sept. 19, 1939 |
| 2,239,180 | Kupfer | Apr. 22, 1941 |
| 2,375,129 | Norton | May 1, 1945 |
| 2,466,719 | MacKearnin | Apr. 12, 1949 |

FOREIGN PATENTS

| | | |
|---|---|---|
| 806,479 | Germany | June 14, 1951 |